(12) United States Patent
Luo et al.

(10) Patent No.: US 11,595,388 B2
(45) Date of Patent: Feb. 28, 2023

(54) LOCATION-AWARE SERVICE REQUEST HANDLING

(71) Applicant: VMware, Inc., Palo Alto, CA (US)

(72) Inventors: Ye Luo, Beijing (CN); Qi Wu, Beijing (CN); Donghai Han, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/533,139

(22) Filed: Nov. 23, 2021

(65) Prior Publication Data

US 2022/0086150 A1 Mar. 17, 2022

Related U.S. Application Data

(63) Continuation of application No. 16/542,304, filed on Aug. 16, 2019, now Pat. No. 11,190,508.

(51) Int. Cl.

| H04L 9/40 | (2022.01) |
|---|---|
| H04L 41/0893 | (2022.01) |
| H04L 61/5014 | (2022.01) |
| G06F 9/455 | (2018.01) |
| H04L 61/2557 | (2022.01) |

(52) U.S. Cl.
CPC ...... *H04L 63/0876* (2013.01); *H04L 41/0893* (2013.01); *H04L 61/5014* (2022.05); *H04L 63/20* (2013.01); *G06F 9/45558* (2013.01); *G06F 2009/45595* (2013.01); *H04L 61/2557* (2013.01)

(58) Field of Classification Search
CPC .............. H04L 41/046; H04L 41/0806; H04L 41/0893; H04L 41/0894; H04L 41/0895; H04L 63/0876; H04L 61/4511; H04L 61/5014; G06F 9/45558; G06F 2009/45595

See application file for complete search history.

(56) References Cited

U.S. PATENT DOCUMENTS

| 7,003,555 B1 | 2/2006 | Jungck |
| 9,489,154 B1 | 11/2016 | Haapanen et al. |
| 10,348,684 B2 * | 7/2019 | Wakumoto .......... H04L 63/0245 |
| 2015/0363221 A1 | 12/2015 | Terayama et al. |
| 2018/0262467 A1 * | 9/2018 | Jayawardena ...... H04L 63/0254 |

(Continued)

OTHER PUBLICATIONS

Yang et al. English translation of CN 106341418 A. (Year: 2017).*

(Continued)

*Primary Examiner* — John M MacIlwinen
(74) *Attorney, Agent, or Firm* — Su IP Consulting

(57) ABSTRACT

Example methods and systems are provided for location-aware service request handling. The method may comprise: generating and sending location information associated with virtualized computing instance to a service node or a management entity for transmission to the service node. The location information may identify logical element(s) to which the virtualized computing instance is connected. The method may further comprise: in response to detecting, from the virtualized computing instance, a service request for a service from the service node, generating a modified service request by modifying the service request to include the location information associated with the virtualized computing instance; and sending the modified service request towards the service node.

21 Claims, 6 Drawing Sheets

(56) References Cited

U.S. PATENT DOCUMENTS

| 2018/0270189 | A1* | 9/2018 | Montenot | H04L 63/0876 |
| 2020/0112574 | A1* | 4/2020 | Koral | H04L 61/4511 |
| 2020/0195669 | A1* | 6/2020 | Karasaridis | G06N 3/088 |
| 2020/0412716 | A1 | 12/2020 | Luo et al. | |

OTHER PUBLICATIONS

Cox Jr, Jacob H., Russell J. Clark, and Henry L. Owen III. "Leveraging SDN to improve the security of DHCP." Proceedings of the 2016 ACM International Workshop on Security in Software Defined Networks & Network Function Virtualization. (Year: 2016).*

Ahmed, Muhammad Ejaz, Hyoungshick Kim, and Moosung Park. "Mitigating DNS query-based DDoS attacks with machine learning on software-defined networking." MILCOM 2017-2017 IEEE Military Communications Conference (MILCOM). IEEE. (Year: 2017).*

Jhen-Li Wang et al., "An SDN-based Defensive Solution against DHCP Attacks in the Virtualization Environment", 2017 IEEE Conference on Dependable and Secure Computing, Taipei, Taiwan, 2017, pp. 529-530.

Bartlomiej Siniarski Cristian Olariu et al., "Real-time monitoring of SDN networks using non-invasive cloud-based logging platforms", 2016 IEEE 27th Annual International Symposium on Personal, Indoor, and Mobile Radio Communications (PIMRC), Valencia, Spain, 2016, pp. 1-6.

Rohit Katiyar et al., "Auto-Configuration of SDN Switches in SDN/Non-SDN Hybrid Network", In Proceedings of the Asian Internet Engineering Conference (AINTEC'15), Association for Computing Machinery, New York, NY, USA, 2015, pp. 48-53.

Cansu Toprak et al., "Detection of DHCP Starvation Attacks in Software Defined Networks: A Case Study", 2018 3rd International Conference on Computer Science and Engineering (UBMK), Sarajevo, Bosnia and Herzegovina, 2018, pp. 636-641.

Jian Wang et al., "A Novel Floodless Service Discovery Mechanism Designed for Software-Defined Networking", In China Communications, Feb. 2014, pp. 12-25, vol. 11, No. 2.

Husameldin Mukhtar et al., "Mitigation of DHCP Starvation Attack", Computers and Electrical Engineering 38, Sep. 2012, pp. 1115-1128.

M. Patrick et al., "DHCP Relay Agent Information Option", Network Working Group—Standards Track, Jan. 2001, pp. 1-14.

* cited by examiner

LOCATION-AWARE SERVICE REQUEST HANDLING

CROSS-REFERENCE TO RELATED APPLICATIONS

The present application is a continuation application under 35 U.S.C. § 120 of U.S. patent application Ser. No. 16/542,304, filed Aug. 16, 2019, which in turn claims the benefit under 35 U.S.C. § 119(a) of Patent Cooperation Treaty (PCT) Application No. PCT/CN2019/093374, filed Jun. 27, 2019. U.S. patent application Ser. No. 16/542,304 and PCT Application No. PCT/CN2019/093374 are incorporated herein by reference.

BACKGROUND

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, VMs may require various network services to interact with other entities in the SDN environment. One example is an address assignment service using dynamic host configuration protocol (DHCP) where a VM may request for an Internet Protocol (IP) address assignment. However, such network services may be vulnerable to malicious attacks.

DETAILED DESCRIPTION

Figure 1:
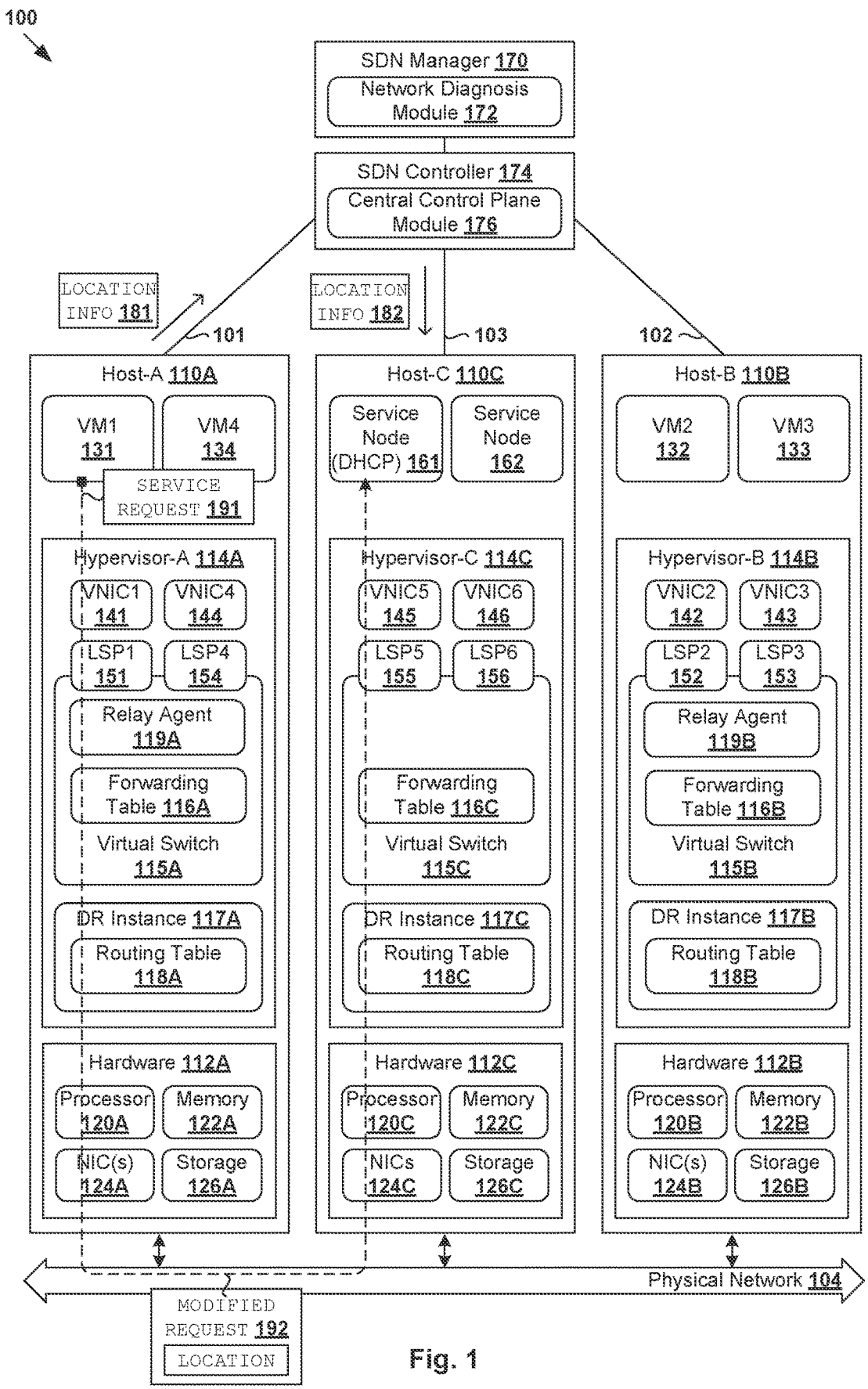
FIG. 1 is a schematic diagram illustrating an example software-defined networking (SDN) environment in which location-aware service request handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network security will now be explained in more detail using FIG. 1, which is a schematic diagram illustrating example software-defined networking (SDN) environment 100 in which location-aware service request handling may be performed. It should be understood that, depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (also known as a "host computers", "host devices", "physical servers", "server systems", "transport nodes," etc.), where each host may be supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM4 134; host-B 110B supports VMs 132-133; and host-C 110C supports VMs 135-136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc.

Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A and VM2 132 on host-B 110B may be connected to the same logical switch and located on the same logical layer-2 segment, such as a segment with VXLAN network identifier (VNI)=6000.

SDN manager 170 and SDN controller 174 are example network management entities in SDN environment 100. To send and receive the control information (e.g., configuration information), each host 110A/110B/110C may implement local control plane (LCP) agent (not shown) to interact with SDN controller 174. For example, control-plane channel 101/102/103 may be established between SDN controller 174 and host 110A/110B/110C using TCP over Secure Sockets Layer (SSL), etc. Management entity 170/174 may be implemented using physical machine(s), virtual machine(s), a combination thereof, etc.

Each host 110A/110B/110C also maintains data-plane connectivity with other host(s) via physical network 104 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying a logical overlay network (e.g., VNI=6000). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via a tunnel established between a pair of VTEPs over physical network 104, over which respective hosts are in layer-3 connectivity with one another.

In the example in FIG. 1, service node 161/162 may be configured to provide service(s) to VMs 131-134. For example, service node 161 supported by host-C 110C may be configured to provide a host configuration service using dynamic host configuration protocol (DHCP), such as to assign an IP address to VM1 131. DHCP may also be used to assign other configuration parameters, such as a subnet mask, a default gateway, a Domain Name Service (DNS) server address, etc. Depending on the desired implementation, service node 161 may be an edge node or logical service router (SR), which represents a centralized routing component that is deployed to provide centralized stateful services, such as DHCP, load balancing, network address translation (NAT), etc. It should be understood that service node 161 may be implemented using one VM (as shown in FIG. 1) or multiple VMs, or a physical machine (e.g., bare metal server).

Conventionally, service node 161/162 is susceptible to malicious attacks that are harmful to network security. For example, a spoofing attack occurs when a malicious party impersonates another entity on the network in order to launch attacks against particular servers, spread malware, bypass access controls, steal information, etc. One example is MAC address spoofing where a malicious party uses a spoofed source MAC address (e.g., impersonating VM1 131) to launch a DHCP starvation attack against a DHCP server. During the attack, malicious VMs may flood an organization's DHCP server(s) with DHCP request messages using spoofed source MAC addresses, which affects network performance.

Location-Aware Service Request Handling

Figure 2:
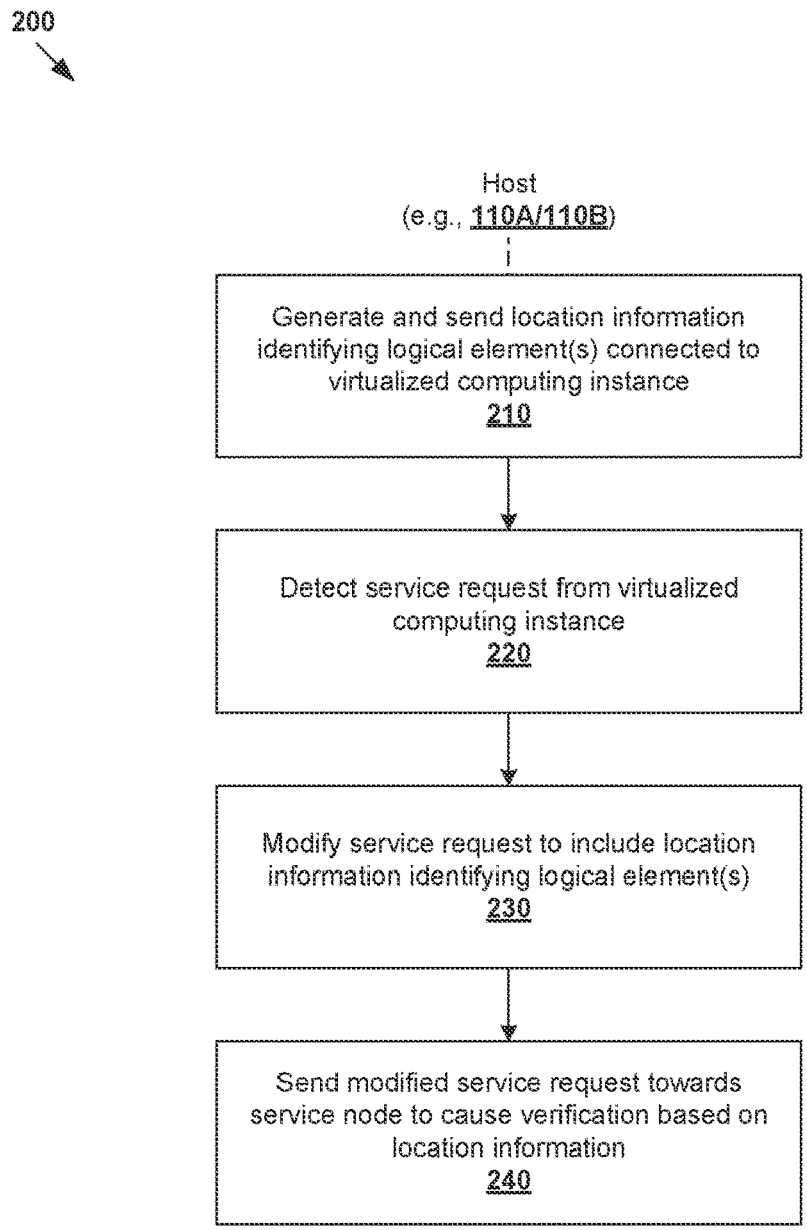
FIG. 2 is a flowchart of an example process for a host to perform location-aware service request handling in an SDN environment.

According to examples of the present disclosure, a "location-aware" approach may be implemented to improve network security in SDN environment 100. In more detail, FIG. 2 is a flowchart of example process 200 for host 110A/110B to perform location-aware service request handling in SDN environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In practice, example process 200 may be implemented by any host 110A/110B, such as using virtual switch 115A/115B (e.g., relay agent 119A/119B) implemented by hypervisor 114A/114B. In the following, various examples will be discussed using VM 131/132/133/134 as an example "virtualized computing instance," host 110A/110B as an example "host."

At 210 in FIG. 2, host-A 110A may generate and send location information (see 181-182 in FIG. 1) associated with VM1 131 to service node 161, or management entity 170/174 for transmission to service node 161. The location information associated with VM1 131 may identify one or more logical elements to which VM1 131 is connected. As used herein, the term "logical element" may refer generally to a logical entity that is deployed in a logical network, such as a logical switch port, logical switch, logical router port, logical router, VNIC, etc. The term "location information" may identify any suitable logical element(s) that indicate a unique location associated with the VM within the logical network. The location information may be in any suitable format, such as ID, address, etc.

At 220, 230 and 240 in FIG. 2, in response to detecting, from VM1 131, a service request (see 191 in FIG. 1) to request for a service from service node 161, host-A 110A may generate and send a modified service request (see 192 in FIG. 1). The "modified service request" may be generated by modifying the service request to include location information associated with VM1 131. For example, the location information may identify a logical switch port (e.g., LSP1 151) and a logical switch (e.g., LS1 401 in FIG. 4) to which VM1 131 is connected. This way, the modified service request may be sent to service node 161 to cause service node 161 to perform verification based on the location information when providing the service to VM1 131.

As used herein, the term "service" may be any suitable functionality provided by service node 161, such as IP address assignment according to DHCP, parameter configuration, domain name system (DNS) service, etc. In the case of DHCP, the "service request" may be a DHCP request to request for an IP address assignment from "service node"=DHCP server 161. To implement the example in FIG. 2, a service node may be configured to enable a location-aware service request handling functionality, such as relay agent information option in the case of DHCP. In this case, the service request may be modified to enable the relay agent information option by configuring a circuit ID sub-option field to identify LSP1 151 ("first logical element") and a remote ID sub-option field to identify LS1 401 ("second logical element") that are connected to VM1 131. Various examples will be discussed below using FIGS. 3-6.

Configuration

Figure 3:
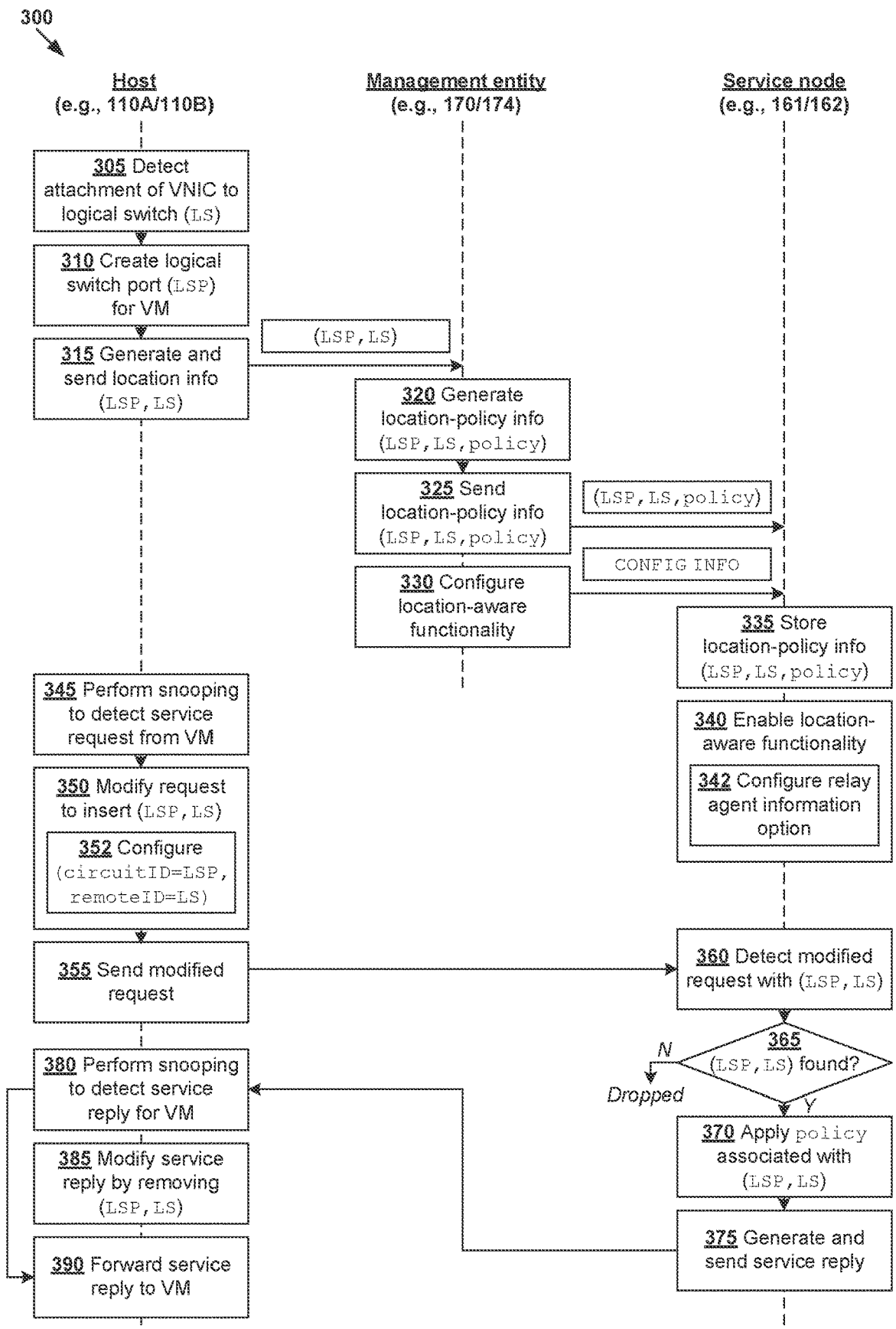
FIG. 3 is a flowchart of an example detailed process of location-aware service request handling in an SDN environment.

FIG. 3 is a flowchart of example detailed process 300 for location-aware service request handling in SDN environment 100. Example process 300 may include one or more operations, functions, or actions illustrated at 305 to 390. The various operations, functions or actions may be combined into fewer blocks, divided into additional blocks, and/or eliminated depending on the desired implementation. Example process 300 may be implemented by any suitable management entity (e.g., SDN manager 170 and/or SDN controller 174) and host 110A/110B (e.g., using relay agent 119A/119B implemented by hypervisor 114A/114B), etc.

Figure 4:
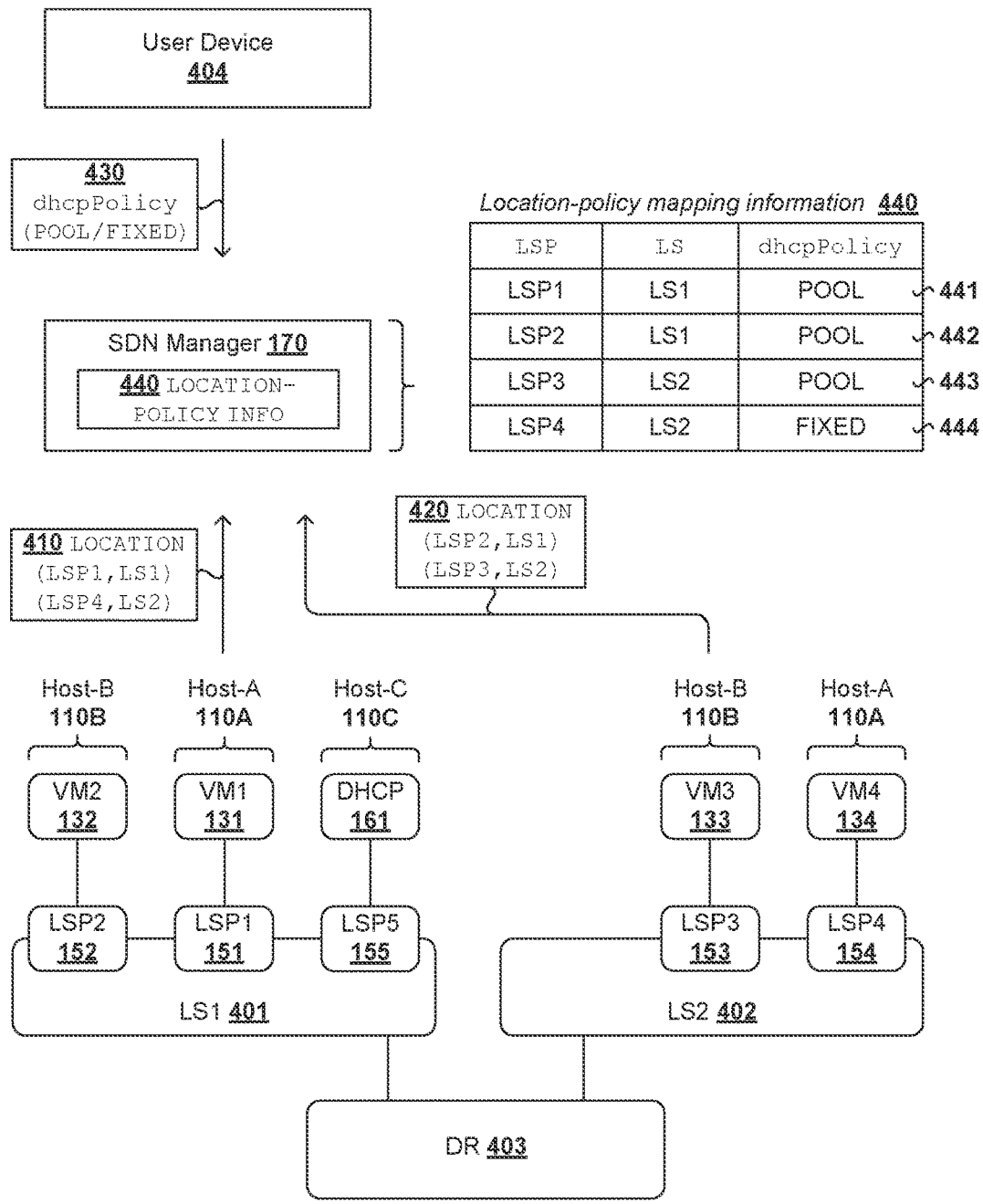
FIG. 4 is a schematic diagram illustrating an example configuration to facilitate location-aware service request handling in an SDN environment.

The example in FIG. 3 will be explained using FIG. 4, which is a schematic diagram illustrating first example location-aware service request handling 400 in SDN environment 100. In the example in FIG. 4, VM1 131, VM2 132 and DHCP server 161 are connected to logical switch LS1 401 associated with a first subnet (e.g., 10.10.10.0/24). VM3 133 and VM4 134 are connected to logical switch LS2 402 (e.g., 20.20.20.0/24). DHCP server 161 is accessible by VM3 133 and VM4 134 via logical router DR 403.

(a) Location Information

At 305 and 310 in FIG. 3, in response to detecting that a VNIC of a VM attaches to a logical switch, host 110A/110B may create a logical switch port for the VNIC and bind the VNIC to the logical switch port. For example in FIG. 4, VNIC1 141 of VM1 131 and VNIC2 142 of VM2 132 may attach to first logical switch=LS1 401. Further, VNIC3 143 of VM3 133 and VNIC4 144 of VM4 134 may attach to second logical switch=LS2 402. In this case, at host-A 110A, when VNIC1 141 of VM1 131 attaches to LS1 401, virtual switch 115A may create and bind LSP1 151 to VNIC1 141. When VNIC4 144 of VM4 134 attaches to LS2 402, virtual switch 115A may create and bind LSP4 154 to VNIC4 144. Similarly, at host-B 110B, virtual switch 115B may create and bind LSP1 152 to VNIC2 142, as well as LSP3 153 to VNIC3 143.

At 315 in FIG. 3, host 110A/110B may generate and send location information associated with each VM to SDN manager 170 for transmission to DHCP server 161. In the example in FIG. 4, host-A 110A may send SDN manager 170 location information (see 410) associated with VM1 131 and VM4 134. The location information identifies logical element(s) to which each VM is connected, such as (LSP1, LS1) for VM1 131 and (LSP4, LS2) for VM4 134. Further, host-B 110B may send SDN manager 170 location information (see 420) identifying (LSP2, LS1) for VM2 132 and (LSP3, LS2) for VM3 133.

In practice, it should be understood that location information 410/420 may be sent to DHCP server 161 directly, or via another intermediate entity. The location information 410/420 is uniquely associated with each VM. For example in FIG. 4, location information=(LSP1, LS1) is uniquely associated with VM1 131 because only VM1 131 is connected to both LSP1 151 and LS1 401. Similarly, location information=(LSP2, LS2) is uniquely associated with VM2 132 because only VM2 132 is connected to both LSP2 152 and LS2 402.

(b) Policy Information

At 320 in FIG. 3, SDN manager 170 may generate location-policy mapping information (see 440 in FIG. 4) by storing location information (see 410-420) in association with policy information (see 430) configured for each VM. Here, the term "policy information" may refer generally to any suitable rule(s) or requirement(s) associated with a service. In practice, the policy information may be configured by a user (e.g., network administrator) operating user device 404 via any suitable interface supported by SDN manager 170, such as graphical user interface (GUI), command-line interface (CLI), application programming interface (API) calls, etc.

In the case of service=DHCP, the policy information may specify how IP addresses are assigned, such as dhcpPolicy=POOL (allocation from a pool of IP addresses), dhcpPolicy=FIXED (fixed IP address allocation), etc. For example, VM1 131 is associated with location information= (LSP1, LS1) and DHCP policy information dhcpPolicy=POOL. Further, VM2 132 is associated with (LSP2, LS1, dhcpPolicy=POOL), VM3 133 with (LSP3, LS2, dhcpPolicy=POOL), and VM4 134 with (LSP4, LS2, dhcpPolicy=FIXED). See 441-444 in FIG. 4.

At 325 and 330 in FIG. 3, SDN manager 170 may send location-policy mapping information 440 to service node=DHCP server 161 via SDN controller 174. This has the effect of synchronizing the DHCP policy information with SDN controller 174 on the central control plane. An example will be described using FIG. 5, which is a schematic diagram illustrating first example 500 of location-aware request handling in SDN environment 100. Referring to 510 in FIG. 5, SDN manager 170 may send the following location-policy mapping information to DHCP server 161 via SDN controller 174: (LSP1, LS1, policy=POOL) associated with VM1 131 and (LSP4, LS2, policy=FIXED) associated with VM4 134.

(c) Enabling Location-Aware Functionality

At 335 and 340 in FIG. 3, SDN manager 170 may configure DHCP server 161 to enable location-aware DHCP request handling. This way, DHCP server 161 may use the location information as a form of verification or authentication during DHCP request handling before applying associated policy information for a particular VM. Note that configuration 520 of DHCP server 161 may be performed before, during or after sending the location-policy mapping information.

Figure 5:
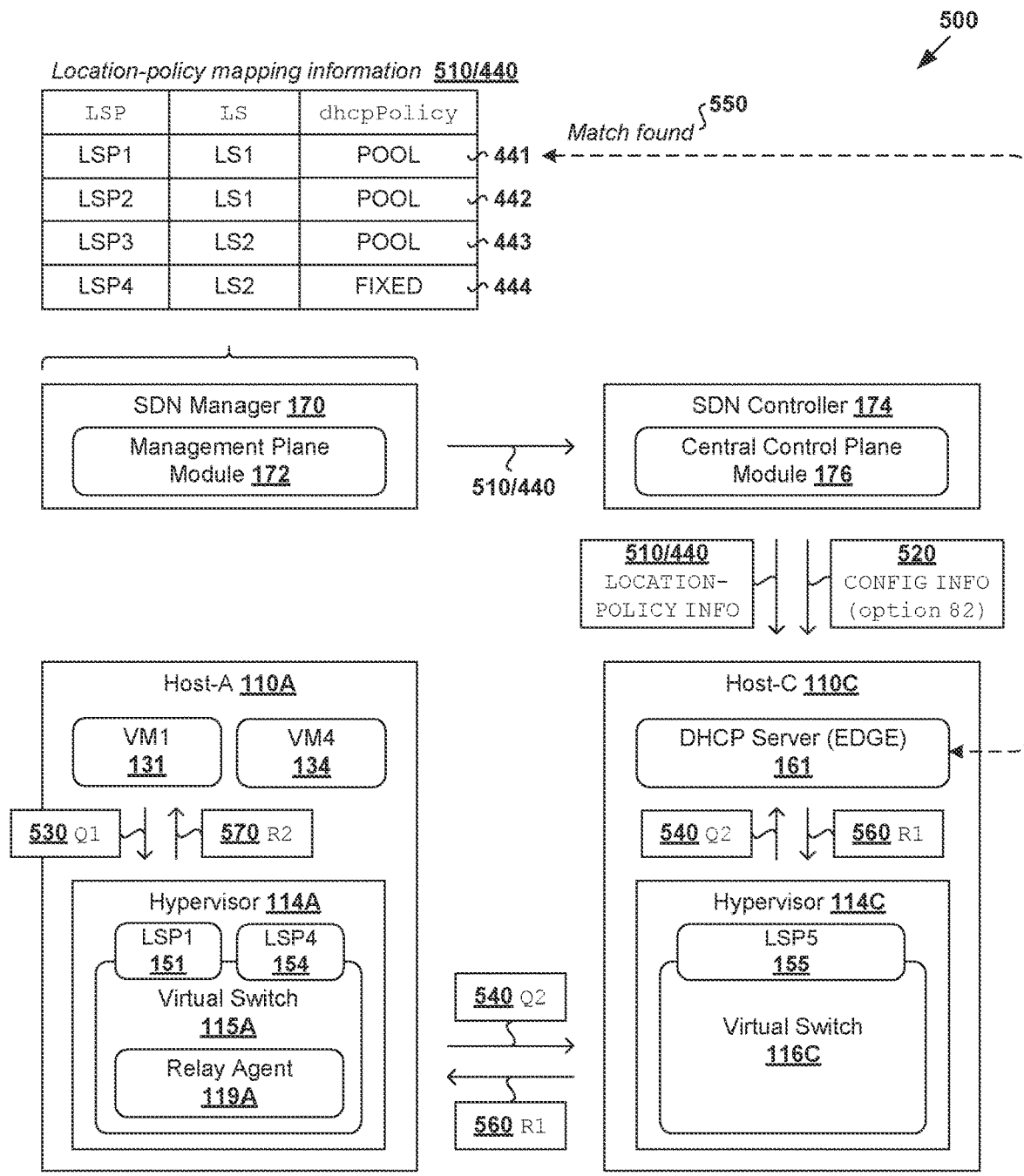
FIG. 5 is a schematic diagram illustrating a first example location-aware service request handling in an SDN environment.

In the case of DHCP, block 340 may involve SDN manager 170 configuring DHCP server 161 to enable a DHCP relay agent information option (also known as "option 82," see 520 in FIG. 5). The DHCP relay agent information option is defined in request for comments (RFC) 3046 published by a network working group of The Internet Society (2001). The relay agent information option may be enabled to allow virtual switch 115A/115B (or more particularly relay agent 119A/119B) to convey location information associated with a particular DHCP client. The option may include any suitable sub-option, such as a "circuit ID" sub-option and a "remote ID" sub-option.

Conventionally, the circuit ID may be used to convey an agent-local ID of an incoming circuit, and the remote ID a trusted ID for a remote high-speed modem. According to examples of the present disclosure, DHCP relay agent information sub-option(s) may be used to convey location information using (circuit ID=logical switch port ID, remote ID=logical switch ID). Note that sub-option fields may be configured differently (e.g., circuit ID=logical switch ID, remote ID=logical switch port ID), provided they specify the necessary location information associated with a DHCP client. Additionally or alternatively, a sub-option field may specify an ID associated with another logical element (e.g., VNIC) connected to VM.

Location-Aware DHCP Request Handling

DHCP operations generally fall into four phases: (1) a DHCP client performing DHCP server discovery by sending a DHCP Discover message; (2) DHCP server 161 performing IP lease offer by sending a DHCP Offer message; (3) the DHCP client accepting the offer by sending a DHCP Request message; and (4) DHCP server 161 returns a DHCP Acknowledgement (ACK) or Negative Acknowledgement (NACK) message to the DHCP client. The DHCP Discover, DHCP Offer, DHCP Request and DHCP ACK/NACK messages generally have the same message format. An operation (OP) code may be used to specify the message type, such as code=1 for a request from the DHCP client and code=2 for a reply from DHCP server 161.

In the following, consider a scenario where DHCP client=VM1 131 requires an IP address assignment from DHCP server 161. Assume that VM1 131 has received a DHCP Offer message from DHCP server 161, which is also attached to LS1 401. To request for IP address assignment, VM1 131 may generate and send a DHCP request message (see "Q1" 530 in FIG. 5) specifying source address information (source IP address=0.0.0.0, MAC address=MAC-VM1). Depending on the desired implementation, DHCP request 530 may be a broadcast message to accept a DHCP offer from DHCP server 161 (and reject any other offer). In this case, DHCP request 530 may specify destination address information (IP address=255.255.255.255, MAC address=FF:FF:FF:FF:FF:FF).

At 345 and 350 in FIG. 3, virtual switch 115A (e.g., using relay agent 119A) may perform snooping to detect or intercept DHCP request 530 from VM1 131 via LSP1 151 and VNIC1 141, and insert location information associated with VM1 131. In particular, block 350 may involve generating a modified DHCP request (see "Q2" 540 in FIG. 5) to enable the relay agent information option by configuring sub-option fields (circuit ID=LSP1, remote ID=LS1) to indicate a unique location of VM1 131.

At 355 in FIG. 3, modified DHCP request 540 is broadcasted to reach DHCP server 161 (and other DHCP servers that are not shown). To reach host-C 110C, for example, modified DHCP request 540 may be encapsulated with an outer header (e.g., GENEVE header) identifying (a) a source VTEP (e.g., VTEP IP address=IP-A, MAC address=MAC-A) implemented by hypervisor-A 114A on host-A 110A and (b) a destination VTEP (e.g., VTEP IP address=IP-C, MAC address=MAC-C) implemented by hypervisor-C 110C on host-C 110C. Since VM1 131 and VM2 132 are attached to the same LS1 401 in the example in FIG. 4, modified DHCP request 540 is also sent to host-B 110B, where it will be dropped.

At 360 and 365 in FIG. 3, in response to detecting modified DHCP request 540, DHCP server 161 may perform verification as to whether (circuit ID=LSP1, remote ID=LS1) in modified DHCP request 540 match with location information 510/440 received from SDN manager 170. This may involve searching for (LSP1, LS1) in location information 510/440. If found, the process proceeds to block 370. Otherwise (not found), modified DHCP request 540 will be dropped because the location information cannot be verified.

At 370 and 375 in FIG. 3, in response to finding a match (see 550 in FIG. 5), DHCP server 161 may apply dhcpPolicy=POOL associated with (LSP1, LS1), and respond with a DHCP reply (see "R1" 560). In the example in FIG. 5, DHCP server 161 assigns an IP address=IP-1 to VM1 131 from a pool of multiple IP addresses. DHCP reply 560 may be a unicast DHCP ACK message specifying source address information (IP address=IP-D, MAC address=MAC-D) associated with DHCP server 161. DHCP reply 560 also includes a "your IP address" (YIADDR) field specifying IP address=IP-VM1 assigned by DHCP server 161 to VM1 131.

At 380 in FIG. 3, virtual switch 115A (e.g., using relay agent 119A) may perform snooping to detect or intercept DHCP reply 560 from DHCP server 161. Depending on the desired implementation, DHCP reply 560 may or may not specify sub-option fields (circuit ID=LSP1, remote ID=LS1) associated with VM1 131. If yes, (circuit ID=LSP1, remote ID=LS1) may be removed from DHCP reply 560 before it is forwarded to VM1 131. This way, location-aware service request handling may be performed in a manner that is transparent to VM1 131. See corresponding 385-390 in FIG. 3. VM1 131 may receive (modified) DHCP reply 570 via LSP1 151 and VNIC1 141, and start using IP address=IP-1 for its communication with other entities.

Examples of the present disclosure should be contrasted against approaches that require a network administrator to bind a DHCP client's MAC address to a particular DHCP policy configured for the DHCP client. Such approaches may be vulnerable to malicious attacks because MAC addresses (e.g., MAC-1 of VM1 131) may be spoofed. Further, a DHCP client's MAC address might change during the lifecycle of the VM, which necessitates an update to the relevant (MAC address, policy) mapping.

In contrast, using a "location-aware" approach, the location information (e.g., LSP1, LS1) may represent a more permanent identity of VM1 131. Since the location information is managed and distributed by SDN manager 170 and SDN controller 174 (instead of the VMs themselves), network security may be improved. Since MAC address may be easily spoofed, the location-aware approach also decouples a VM's MAC address from the IP address assignment process using DHCP. To further enhance network security, the location information may be maintained by network management entity 170/174 and independently from each VM.

The location-aware approach may also be self-adaptive. For example, when VM1 131 is migrated from host-A 110A to host-B 110B, VM1 131 usually remains attached to LSP1 151 and LS1 401. In this case, it is not necessary to update associated location-policy mapping information=(LSP1, LS1, dhcpPolicy=POOL) stored by SDN manager 170 and DHCP server 161. However, when VNIC1 141 detaches from LS1 401, or VNIC1 141 is destroyed, host-A 110A may report the detach or destroy event to SDN manager 170 such that the associated location-policy mapping information may be removed. In this case, DHCP server 161 may reclaim the IP address (e.g., IP-1) assigned to VM1 131, and reassign it to another endpoint.

Other Services

Figure 6:
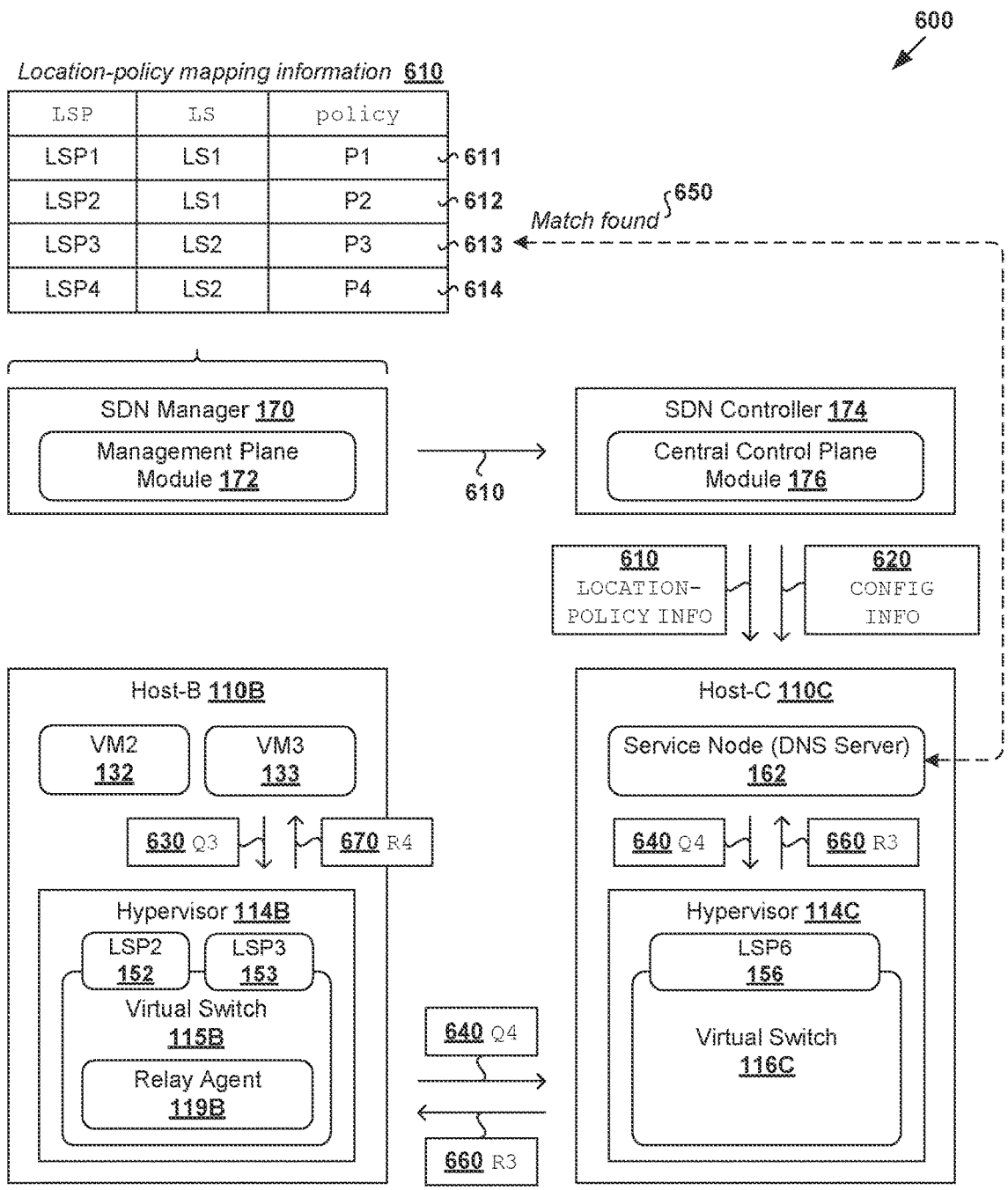
FIG. 6 is a schematic diagram illustrating a second example location-aware service request handling in an SDN environment.

Besides DHCP, it should be understood that examples of the present disclosure may be implemented using any additional and/or alternative "service." FIG. 6 is schematic diagram illustrating second example 600 of location-aware request handling in SDN environment 100. In this example, service node 162 may be configured to provide any suitable (non-DHCP) service, such as resource allocation service, domain name translation service using domain name system (DNS), etc.

At 610 in FIG. 6, SDN manager 170 may disseminate location-policy mapping information associated with a service provided by service node 162 via SDN controller 174. For example, VM1 131 is associated with location information (LSP1, LS1) and policy information (policy=P1); VM2 132 with (LSP2, LS1, P2); VM3 133 with (LSP3, LS2, P3); and VM4 134 with (LSP4, LS2, P4). See 611-614 in FIG. 6. Similar to the example in FIG. 4, service policies P1-P4 may be configured by a user (e.g., network administrator) operating user device 404 via a user interface supported by SDN manager 170. At 620, SDN manager 170 may also configure service node 162 to enable a location-aware service request handling functionality. This enables service node 161 to perform verification based on the location information.

At 630 and 640 in FIG. 6, in response to detecting a service request (see "Q3" 630) from VM3 133 via VNIC3 143 and LSP3 153, relay agent 119B at virtual switch 115B may generate and send a modified service request (see "Q4" 640) in a unicast manner. Modified service request 640 includes location information (LSP3, LS2) identifying LSP3 153 and LS2 401 to which VNIC3 143 of VM3 133 attaches (see FIG. 4). Modified service request 640 also specifies source address information (IP-3, MAC-3) associated with VM3 133, and destination address information (IP-S, MAC-S) associated with service node 162.

At 650 in FIG. 6, in response to verifying that (LSP3, LS2) in modified service request 640 matches with location information 613 received from SDN manager 170, service node 162 may apply policy=P3 configured for VM3 133. At 660, service node 162 responds to modified service request 640 with a service reply (see "R3" 660). For example, service reply 660 may identify a resource allocated to VM3 133, or information required by VM3 133. Service reply 660 also specifies source address information (IP-S, MAC-S) associated with service node 162, and destination address information (IP-3, MAC-3) associated with VM3 133.

At 670 and 680 in FIG. 6, virtual switch 115B may receive and forward service reply 660 to VM3 133. As explained using FIG. 5, location information (LSP3, LS2) may be first removed before forwarding modified service reply 670 to VM3 133.

In the case of DNS, a DNS policy configured for a particular VM may include a list of domain names that will be translated for the VM. Using VM1 131 as an example, DNS policy=P1 (see 611) associated with (LSP1, LS1) may specify a whitelist of translatable domain names, such as (www.domain-1a.com, www.domain-1b.com, www.domain-1c.com). In another example, DNS policy=P3 (see 613) associated with (LSP3, LS1) may specify another whitelist of translatable domain names, such as (www.domain-1a.com, www.domain-3a.com, www.domain-3b.com) for VM3 133. Alternatively or additionally, each DNS policy may specify a blacklist of domain names that will blocked (i.e., not translated) for a particular VM.

Service node 162 in FIG. 6 may be a DNS server that is configured to perform verification based on the location information in modified DNS request 640 prior to applying a DNS policy associated with the location information. In practice, location information (LSP3, LS2) may be added to any suitable existing or newly configured field(s) in modified DNS request 640. Since service node 162 is configured to verify the location information added to DNS requests before responding with a DNS reply, the risk of malicious attacks may be reduced. One example is DNS server spoofing where a malicious party alters DNS records that are used to direct traffic to fraudulent websites.

Container Implementation

Although explained using VMs 131-134, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134. Containers are "OS-less", meaning that they do not include any OS that could weigh 10s of Gigabytes (GB).

This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to perform location-aware service request handling according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a service node to perform verification of service requests in a software-defined networking (SDN) environment, the method comprising:
   receiving, by the service node, first location information associated with a virtualized computing instance, wherein the first location information uniquely identifies one or more logical elements to which the virtualized computing instance is connected;
   storing, by the service node, the first location information;
   detecting, by the service node, a service request that indicates the virtualized computing instance as a source of the request and that includes second location information;
   determining, by the service node, whether the second location information in the service request matches the stored first location information; and
   verifying, by the service node, authenticity of the service request, in response to determination that the second location information matches the stored first location information.

2. The method of claim 1, further comprising:
   dropping, by the service node, the service request, in response to a failure to verify the authenticity of the service request due to a mismatch between the second location information and the stored first location information.

3. The method of claim 1, wherein the service node comprises a dynamic host configuration protocol (DHCP) server, and wherein the service request comprises a DHCP request.

4. The method of claim 1, wherein the service node comprises a domain name system (DNS) server, and wherein the service request comprises a DNS request.

5. The method of claim 1, further comprising:
   in response to verifying the authenticity of the service request due to the second location information matching the stored first location information, applying, by the service node, a policy associated with the second location information to identify an address; and
   sending, by the service node, the identified address in a reply to the service request.

6. The method of claim 1, wherein the second location information identifies a logical switch port and a logical switch to which the virtualized computing instance is connected, and wherein the service request detected by the service node is a modified service request that results from insertion of the second location information into an original service request sent by the virtualized computing instance.

7. The method of claim 1, wherein for security, the first location information is managed and distributed by a network manager instead of the virtualized computing instance, and wherein receiving the first location information includes, receiving, by the service node, the first location information from the network manager.

8. A non-transitory computer-readable storage medium that includes a set of instructions which, in response to execution by a processor of a service node, cause the processor to perform verification of service requests in a software-defined networking (SDN) environment, wherein the method comprises:
receiving, by the service node, first location information associated with a virtualized computing instance, wherein the first location information uniquely identifies one or more logical elements to which the virtualized computing instance is connected;
storing, by the service node, the first location information;
detecting, by the service node, a service request that indicates the virtualized computing instance as a source of the request and that includes second location information;
determining, by the service node, whether the second location information in the service request matches the stored first location information; and
verifying, by the service node, authenticity of the service request, in response to determination that the second location information matches the stored first location information.

9. The non-transitory computer-readable storage medium of claim 8, wherein the method further comprises:
dropping, by the service node, the service request, in response to a failure to verify the authenticity of the service request due to a mismatch between the second location information and the stored first location information.

10. The non-transitory computer-readable storage medium of claim 8, wherein the service node comprises a dynamic host configuration protocol (DHCP) server, and wherein the service request comprises a DHCP request.

11. The non-transitory computer-readable storage medium of claim 8, wherein the service node comprises a domain name system (DNS) server, and wherein the service request comprises a DNS request.

12. The non-transitory computer-readable storage medium of claim 8, wherein the method further comprises:
in response to verifying the authenticity of the service request due to the second location information matching the stored first location information, applying, by the service node, a policy associated with the second location information to identify an address; and
sending, by the service node, the identified address in a reply to the service request.

13. The non-transitory computer-readable storage medium of claim 8, wherein the second location information identifies a logical switch port and a logical switch to which the virtualized computing instance is connected, and wherein the service request detected by the service node is a modified service request that results from insertion of the second location information into an original service request sent by the virtualized computing instance.

14. The non-transitory computer-readable storage medium of claim 8, wherein for security, the first location information is managed and distributed by a network manager instead of the virtualized computing instance, and wherein receiving the first location information includes, receiving, by the service node, the first location information from the network manager.

15. A service node, comprising:
one or more processors; and
a non-transitory computer-readable storage medium that includes a set of instructions which, in response to execution by the one or more processors, cause the one or more processors to perform operations to verify service requests in a software-defined networking (SDN) environment, wherein the operations include:
receive first location information associated with a virtualized computing instance, wherein the first location information uniquely identifies one or more logical elements to which the virtualized computing instance is connected;
store the first location information;
detect a service request that indicates the virtualized computing instance as a source of the request and that includes second location information;
determine whether the second location information in the service request matches the stored first location information; and
verify authenticity of the service request, in response to determination that the second location information matches the stored first location information.

16. The service node of claim 15, wherein the instructions further include:
drop the service request, in response to a failure to verify the authenticity of the service request due to a mismatch between the second location information and the stored first location information.

17. The service node of claim 15, wherein the service node comprises a dynamic host configuration protocol (DHCP) server, and wherein the service request comprises a DHCP request.

18. The service node of claim 15, wherein the service node comprises a domain name system (DNS) server, and wherein the service request comprises a DNS request.

19. The service node of claim 15, wherein the instructions further include:
in response to verification of the authenticity of the service request due to the second location information being matched with the stored first location information, apply a policy associated with the second location information to identify an address; and
send the identified address in a reply to the service request.

20. The service node of claim 15, wherein the second location information identifies a logical switch port and a logical switch to which the virtualized computing instance is connected, and wherein the service request detected by the service node is a modified service request that results from insertion of the second location information into an original service request sent by the virtualized computing instance.

21. The service node of claim 15, wherein for security, the first location information is managed and distributed by a network manager instead of the virtualized computing instance, and wherein the service node is configured to receive the first location information from the network manager.

* * * * *